A. WOOLNER.
Apparatus for Treating Grain for Distillation.
No. 139,749. Patented June 10, 1873.
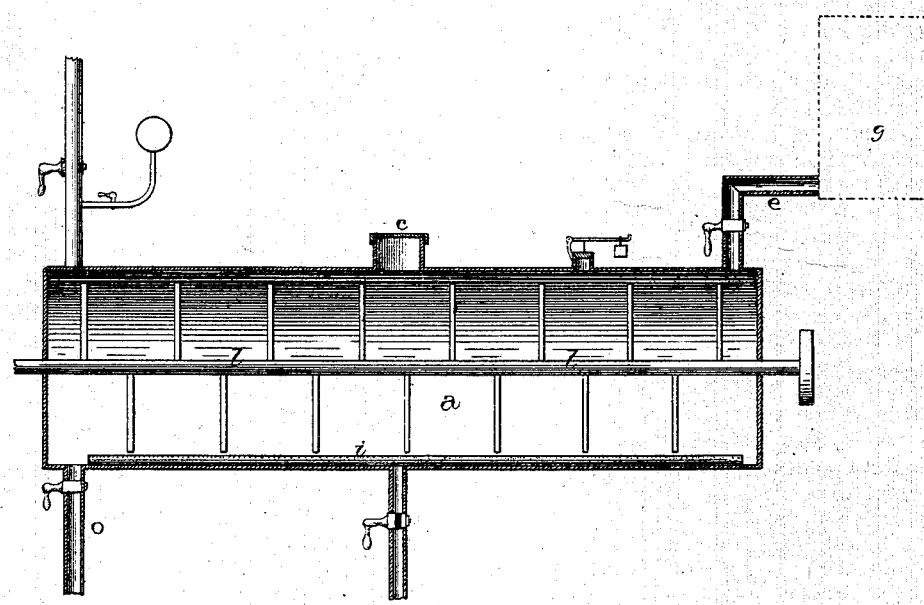
Witnesses.
Inventor.
Adolph Woolner
per
J. A. Lehmann, Atty.

UNITED STATES PATENT OFFICE.

ADOLPH WOOLNER, OF LOUISVILLE, KENTUCKY.

IMPROVEMENT IN APPARATUS FOR TREATING GRAIN FOR DISTILLATION.

Specification forming part of Letters Patent No. 139,749, dated June 10, 1873; application filed May 24, 1873.

*To all whom it may concern:*

Be it known that I, ADOLPH WOOLNER, of Louisville, in the county of Jefferson and State of Kentucky, have invented certain new and useful Improvements in Treating Grain for Distillation; and I do hereby declare the following to be a full, clear, and exact description of the invention, such as will enable others skilled in the art to which it pertains to make and use it, reference being had to the accompanying drawings, which form part of this specification:

The nature of my invention relates to an improvement in the method of treating grain for fermentation; and it consists in boiling the grain in an air-tight vessel, under an increased pressure, so as to expose the starch-globules more to the action of heat and water. It also consists in the arrangement and combination of devices, which will be more fully described hereafter, for treating the grain.

The accompanying drawings represent a longitudinal section of my boiler, in which the grain is treated. $a$ represents a sheet-iron boiler, of any desired shape and size, provided with a man-hole, $c$, for the admission of the grain, and suitable pipes for the admission and discharge of the steam, and conducting the grain to the mash-tub after treatment. Placed above the boiler, and connected therewith by means of the pipe $e$, is the reservoir or tub $g$ for holding the hot water with which the grain is to be treated. Extending the length of the boiler, along the bottom, is a perforated pipe, $i$, through which steam is admitted to the boiler for the purpose of boiling the grain. Extending through the boiler is a revolving stirrer, $l$, of any suitable kind, which keeps the grain constantly stirred during treatment. The grain—preferably corn-meal—is placed in the boiler, after a suitable quantity of hot water, at about 160° Fahrenheit has been let in from the tub, and then the stirrer set in motion. The man-hole having been closed air-tight, steam is admitted through the perforated pipe $i$, which distributes it evenly throughout the boiler, boiling the corn-meal until the pressure-gage shows a pressure of about forty pounds. As soon as this point is reached the steam is let off, and the mash is run into the mash-tub through the pipe $o$, where it is cooled off, mixed with the usual quantity of malt, and again cooled off for yeasting and fermentation.

By treating grain in this manner a better development of the starch-globules is obtained, and they are more exposed to the action of the heat and water, causing an increased gain of both starch and grape-sugar, and consequently a better result in the spirits produced.

This invention is intended as an improvement upon the patent recently granted to me, No. 124,188.

I am aware of the patent to Theo. Hoffman for the manufacture of sugar, dextrine, &c., and disclaim such.

Having thus described my invention, what I claim as new, and desire to secure by Letters Patent, is—

In an apparatus for treating grain for distillation, the boiler, perforated steam-pipe $i$, discharge-pipe $o$, and stirrer $l$, when combined for operation, substantially as shown and described.

In testimony that I claim the foregoing I have hereunto set my hand this 10th day of May, 1873.

ADOLPH WOOLNER.

Witnesses:
ROBERT I. CRAWFORD,
GEORGE VISSMAN.